United States Patent
Hasegawa et al.

(10) Patent No.: US 12,087,326 B1
(45) Date of Patent: Sep. 10, 2024

(54) MAGNETIC DISK DEVICE AND METHOD

(71) Applicants: Kabushiki Kaisha Toshiba, Tokyo (JP); Toshiba Electronic Devices & Storage Corporation, Tokyo (JP)

(72) Inventors: Hitoshi Hasegawa, Kawasaki Kanagawa (JP); Hiroyuki Takeda, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/242,712

(22) Filed: Sep. 6, 2023

(51) Int. Cl.
G11B 20/18 (2006.01)

(52) U.S. Cl.
CPC .................. G11B 20/1889 (2013.01)

(58) Field of Classification Search
None
See application file for complete search history.

(56) References Cited

U.S. PATENT DOCUMENTS

| | | | |
|---|---|---|---|
| 6,282,159 B1 | 8/2001 | Kimura | |
| 7,110,208 B1 | 9/2006 | Miyamura et al. | |
| 7,859,783 B2 | 12/2010 | Tang | |
| 8,711,507 B1* | 4/2014 | Katchmart | G11B 5/59616 360/77.08 |
| 10,748,569 B1* | 8/2020 | Ogawa | G11B 5/59666 |
| 2002/0191318 A1* | 12/2002 | Satoh | G11B 5/59655 360/48 |
| 2009/0231751 A1* | 9/2009 | Asakura | G11B 5/596 |
| 2020/0411051 A1* | 12/2020 | Maeto | G11B 27/10 |
| 2021/0027805 A1* | 1/2021 | Asakura | G11B 5/02 |

* cited by examiner

*Primary Examiner* — Peter Vincent Agustin
(74) *Attorney, Agent, or Firm* — Maier & Maier, PLLC

(57) ABSTRACT

According to an embodiment, upon a failure in detection of a servo mark from servo data recorded in a first normal servo sector in a write operation, a controller of a magnetic disk device stops a write operation. Then, the controller demodulates the servo data including the servo mark, for the servo data recorded in a first short servo sector being a short servo sector immediately before the first normal servo sector, and resumes the write operation from a data area immediately after the first normal servo sector.

9 Claims, 12 Drawing Sheets

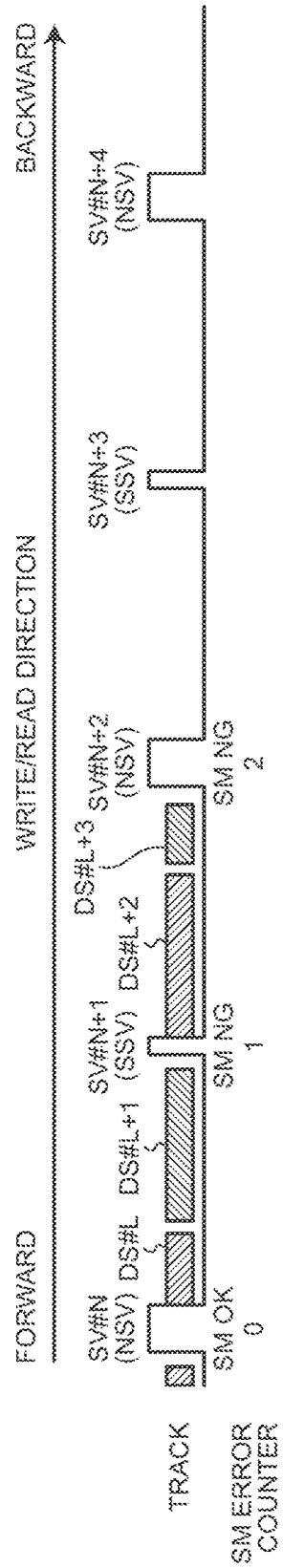
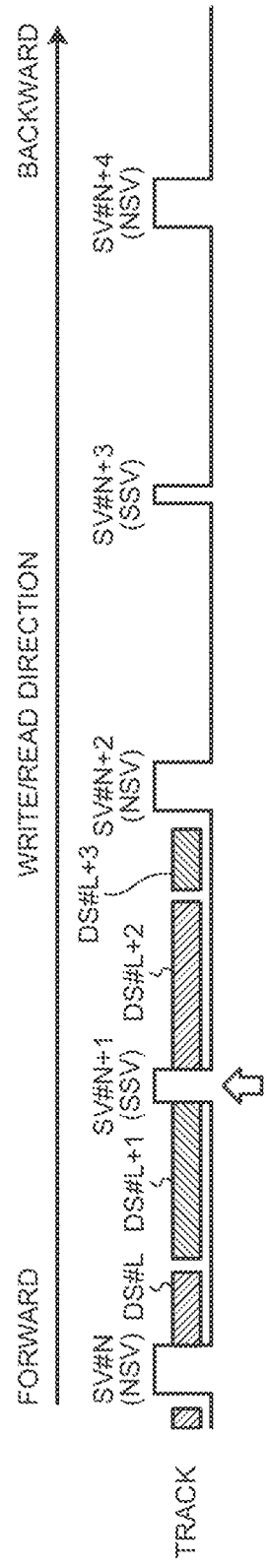
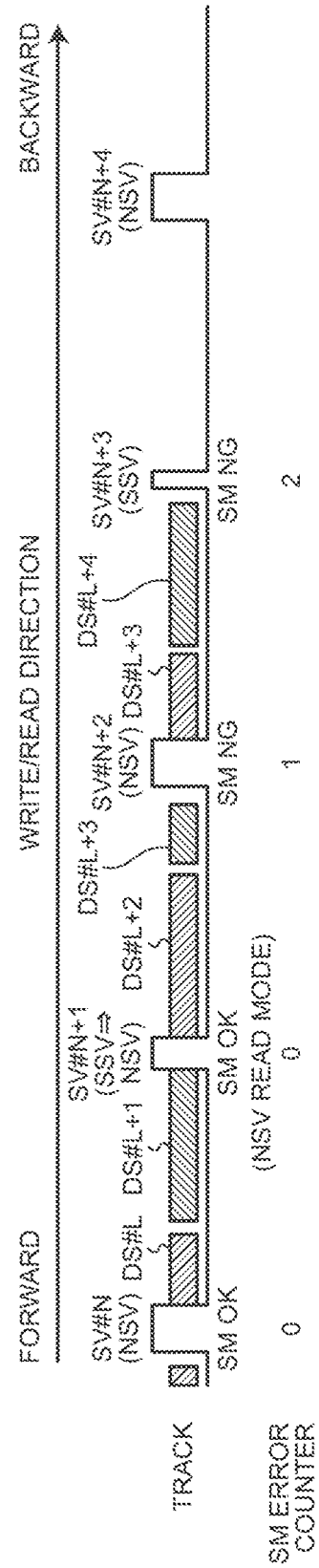

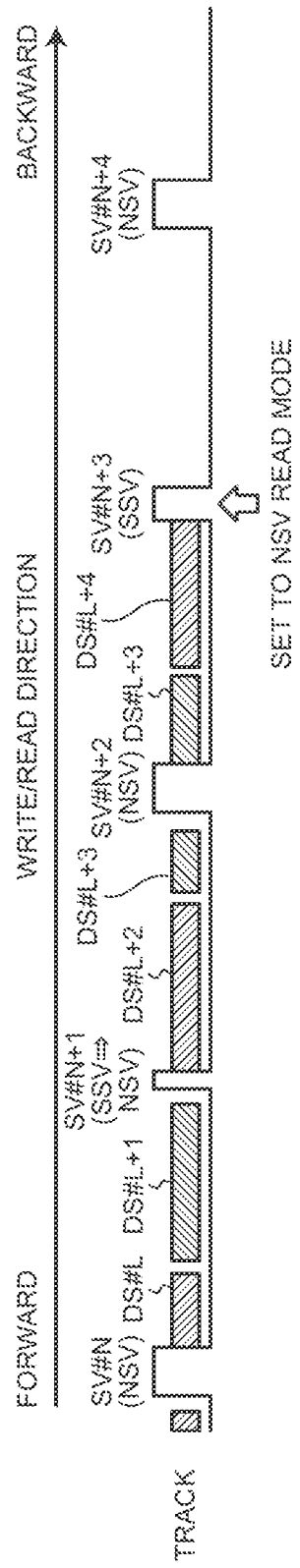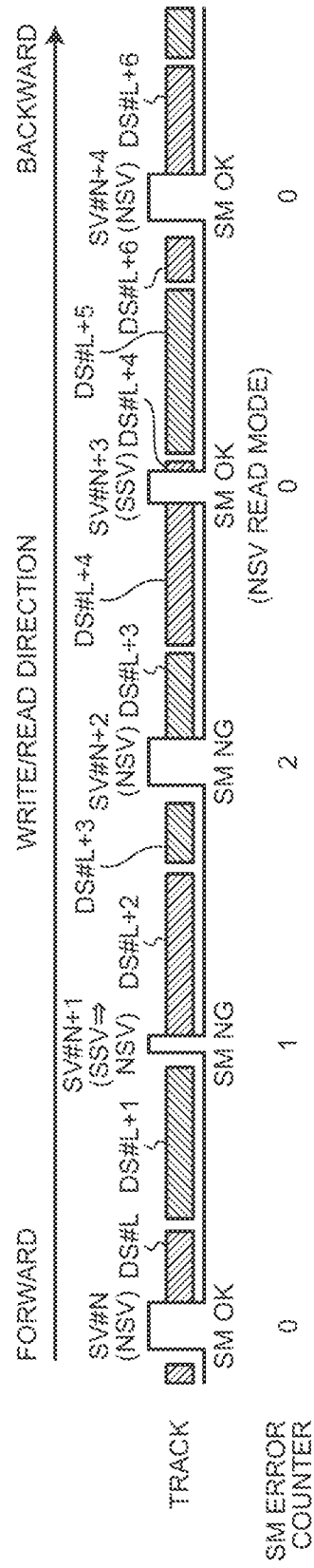

MAGNETIC DISK DEVICE AND METHOD

CROSS-REFERENCE TO RELATED APPLICATIONS

This application is based upon and claims the benefit of priority from Japanese Patent Application No. 2023-043420, filed on Mar. 17, 2023; the entire contents of which are incorporated herein by reference.

FIELD

Embodiments described herein relate generally to a magnetic disk device and a method.

BACKGROUND

A magnetic disk device includes a magnetic disk in which servo sectors are spaced circumferentially. In each of the servo sectors, servo data including a servo mark and a burst pattern is recorded. The servo mark is data used as a reference for adjustment of the timing of demodulating the servo data. The burst pattern is data for detecting an offset amount of the position of a magnetic head from the track center.

In recent years, a magnetic disk device having a usual servo sector (hereinafter, referred to as normal servo sector) and a short servo sector has been studied. Such a magnetic disk device is configured so that, in the short servo sector, the burst pattern is demodulated on the basis of the timing of detection of a servo mark in another servo sector (e.g., the normal servo sector). Therefore, a failure in detection of a servo mark in another servo sector makes impossible to write data in a data area subsequent to a short servo sector, causing a decrease in the capacity of the magnetic disk device.

BRIEF DESCRIPTION OF THE DRAWINGS

FIGS. 9A to 9C are diagrams illustrating an example of a write operation by the controller according to the embodiment, the write operation being performed upon a failure in detection of the servo mark in a certain normal servo sector;

FIGS. 10A and 10B are diagrams illustrating an example of the write operation by the controller according to the embodiment, the write operation being performed upon a failure in detection of the servo mark in the certain normal servo sector;

DETAILED DESCRIPTION

According to the present embodiment, a magnetic disk device includes a magnetic disk, a magnetic head, and a controller. In the magnetic disk, a plurality of first servo sectors each of which has servo data recorded is spaced circumferentially. The servo data includes a servo mark and a burst pattern recorded after the servo mark in a circumferential write/read direction. The magnetic disk includes a plurality of data areas each provided between two first servo sectors adjacent in the circumferential direction. The plurality of first servo sectors includes a plurality of second servo sectors and a plurality of third servo sectors. M (where M is an integer of 1 or more) third servo sectors of the plurality of third servo sectors are arranged, between two adjacent second servo sectors of the plurality of second servo sectors. While the controller performs first demodulation for the servo data recorded in each of the plurality of second servo sectors, and performs second demodulation for the servo data recorded in each of the plurality of third servo sectors, the controller writes data to the plurality of data areas by using the magnetic head. The first demodulation is an operation of detecting the servo mark and demodulating the burst pattern. The second demodulation is an operation of demodulating the burst pattern without detecting the servo mark. Upon a failure in detection of the servo mark in the first demodulation for the servo data recorded in a fourth servo sector being one of the plurality of second servo sectors, the controller operates as follows. That is, the controller stops writing data. The controller performs the first demodulation for the servo data recorded in a fifth servo sector being a third servo sector immediately before the fourth servo sector in the write/read direction, of the plurality of the third servo sectors. When the magnetic head reaches the fourth servo sector after the first demodulation is performed for the servo data recorded in the fifth servo sector, the controller starts writing data from a data area immediately after the fourth servo sector, of the plurality of data areas.

The magnetic disk device and the method according to embodiments will be described in detail below with reference to the accompanying drawings. It should be noted that the present invention is not limited to the embodiments.

Embodiments

Figure 1:
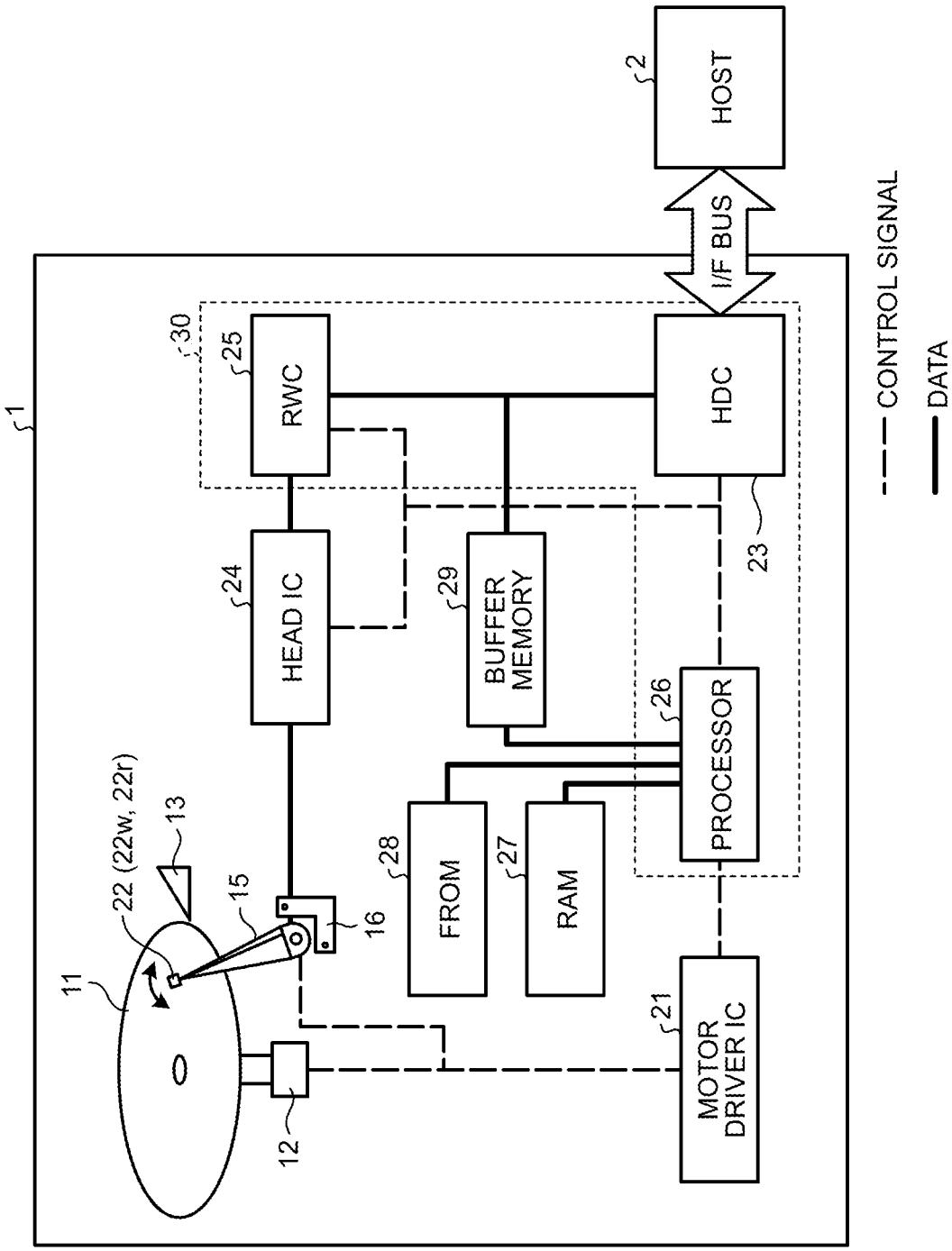
FIG. 1 is a schematic diagram illustrating an exemplary configuration of a magnetic disk device according to an embodiment.

FIG. 1 is a schematic diagram illustrating an exemplary configuration of a magnetic disk device 1 according to an embodiment.

The magnetic disk device 1 is connected to a host 2. The magnetic disk device 1 is configured to receive a write command, a read command, and the like from the host 2.

The magnetic disk device 1 includes a magnetic disk 11 that has a surface on which a magnetic layer is formed. The magnetic disk device 1 writes data on the magnetic disk 11 or reads data from the magnetic disk 11 in response to an access command.

Writing and reading data are performed by using a magnetic head 22. Specifically, the magnetic disk device 1 includes a spindle motor 12, a ramp 13, an actuator arm 15, a voice coil motor (VCM) 16, a motor driver integrated circuit (IC) 21, the magnetic head 22, a hard disk controller (HDC) 23, a head IC 24, a read/write channel (RWC) 25, a processor 26, a RAM 27, a flash read only memory (FROM) 28, and a buffer memory 29, in addition to the magnetic disk 11.

The magnetic disk 11 is rotated at a predetermined rotation speed by the spindle motor 12 that is coaxially mounted. The spindle motor 12 is driven by the motor driver IC 21.

The processor 26 controls the rotation of the spindle motor 12 and the rotation of the VCM 16 via the motor driver IC 21.

The magnetic head 22 writes and reads data to and from the magnetic disk 11 by using a write head 22w and a read head 22r that are included in the magnetic head 22. Furthermore, the magnetic head 22 is mounted to an end of the actuator arm 15. The magnetic head 22 is moved in a radial direction of the magnetic disk 11 by the VCM 16 driven by the motor driver IC 21. The magnetic head 22 includes the write head 22w and the read head 22r, and a plurality of either or both of the write heads 22w and the read heads 22r may be provided for a single magnetic head 22.

For example, when the rotation of the magnetic disk 11 is stopped, the magnetic head 22 is moved onto the ramp 13. The ramp 13 is configured to hold the magnetic head 22 at a position spaced apart from the magnetic disk 11.

In a read operation, the head IC 24 amplifies and outputs a signal read from the magnetic disk 11 by the magnetic head 22, and supplies the signal to the RWC 25. Furthermore, in a write operation, the head IC 24 amplifies a signal corresponding to data to be written, supplied from the RWC 25, and supplies the signal to the magnetic head 22.

The HDC 23 performs control of transmission and reception of data to and from the host 2 via an I/F bus, control of the buffer memory 29, error correction processing for read data, and the like.

Furthermore, the buffer memory 29 is used as a buffer for data transmitted to and received from the host 2. For example, the buffer memory 29 is used to temporarily store data to be written or data read from the magnetic disk 11.

The buffer memory 29 includes, for example, a volatile memory capable of high-speed operation. The type of the memory constituting the buffer memory 29 is not limited to a specific type. The buffer memory 29 can include, for example, a dynamic random access memory (DRAM), a static random access memory (SRAM), or a combination thereof. Note that the buffer memory 29 may include any non-volatile memory.

The RWC 25 modulates data to be written supplied from the HDC 23 and supplies the data to be written to the head IC 24. Furthermore, the RWC 25 demodulates the signal read from the magnetic disk 11 and supplied from the head IC 24, and outputs the signal, as digital data, to the HDC 23.

The processor 26 is, for example, a central processing unit (CPU). The RAM 27, the flash read only memory (FROM) 28, and the buffer memory 29 are connected to the processor 26.

The FROM 28 is a type of nonvolatile memory. The FROM 28 stores firmware (program data), various operation parameters, and the like. Note that the firmware may be stored in the magnetic disk 11.

The RAM 27 includes, for example, DRAM, SRAM, or a combination thereof. The RAM 27 is used as an operation memory by the processor 26. The RAM 27 is used as an area into which the firmware is loaded and an area in which various types of management data are temporarily stored.

The processor 26 performs overall control of the magnetic disk device 1 according to the firmware stored in the FROM 28 or magnetic disk 11. For example, the processor 26 loads the firmware from the FROM 28 or the magnetic disk 11 to the RAM 27, and controls the motor driver IC 21, the head IC 24, the RWC 25, the HDC 23, and the like, according to the loaded firmware.

Note that a configuration including the HDC 23, the RWC 25, and the processor 26 can be considered as a controller 30. In addition to these components, the controller 30 may include another component (e.g., the RAM 27, FROM 28, buffer memory 29, or the like).

Furthermore, the firmware program may be stored in the magnetic disk 11. Some or all of the functions of the processor 26 may be implemented by a hardware circuit such as a field-programmable gate array (FPGA) or an application specific integrated circuit (ASIC).

Figure 2:
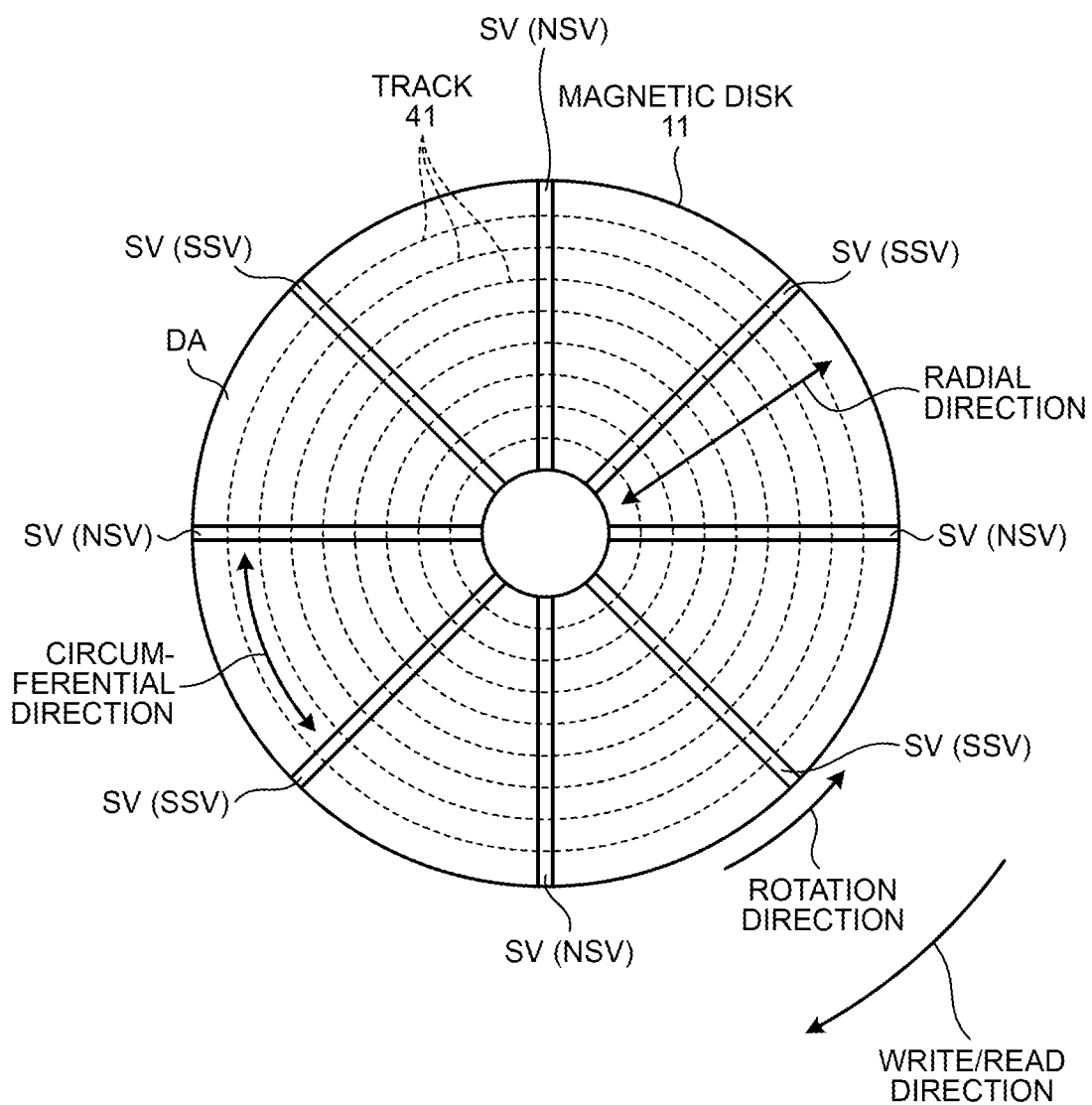
FIG. 2 is a schematic diagram illustrating an exemplary configuration of the magnetic disk according to the embodiment.

FIG. 2 is a schematic diagram illustrating an exemplary configuration of the magnetic disk 11 according to the embodiment. Note that in this drawing, an exemplary rotation direction of the magnetic disk 11 is illustrated. The magnetic head 22 moves relative to the magnetic disk 11 due to the rotation of the magnetic disk 11. Therefore, the write/read direction, that is, a circumferential direction in which data is written or read by the magnetic head 22 is opposite to the rotation direction of the magnetic disk 11.

The servo data used for positioning the magnetic head 22 is written to the magnetic disk 11 by, for example, a servo writer or self-servo writing (SSW) in a manufacturing process. According to FIG. 2, a plurality of servo areas SV disposed radially and spaced at predetermined circumferential intervals is drawn as an example of the arrangement of the servo areas in which the servo data are written. A space between two servo areas SV continuous in the circumferential direction is used as a data area DA in which data is written.

The plurality of servo areas SV includes a plurality of normal servo areas NSV and a plurality of short servo areas SSV. M short servo areas SSV (where M is an integer of 1 or more) are each arranged between two normal servo areas NSV adjacent in the circumferential direction. According to the example illustrated in FIG. 2, the normal servo areas NSV and the short servo areas SSV are alternately arranged in the circumferential direction.

A plurality of concentric tracks 41 is set in the radial direction of the magnetic disk 11. In the data area DA, a plurality of data sectors are continuously formed along each of the tracks 41. The servo data written in the servo area SV is used for positioning of the read head 22r or write head 22w of the magnetic head 22, on a target track 41. While the read head 22r or the write head 22w is positioned on the target track 41, data is written into or read from a target data sector.

Hereinafter, areas partitioned by the normal servo areas NSV on the track 41 are each referred to as normal servo sector NSV. Areas partitioned by the short servo areas SSV on the track 41 are each referred to as short servo sector SSV. In addition, the normal servo sector NSV and the short servo sector SSV are collectively referred to as servo sector SV. Furthermore, each servo sector SV is identified by a servo sector number that is a unique number in the track 41. The servo sector SV having a servo sector number x (where x is an integer of 0 or more) may be referred to as servo sector SV #x.

Note that the servo sector SV is an example of the first servo sector. The normal servo sector NSV is an example of the second servo sector. The short servo sector SSV is an example of the third servo sector.

Figure 3:
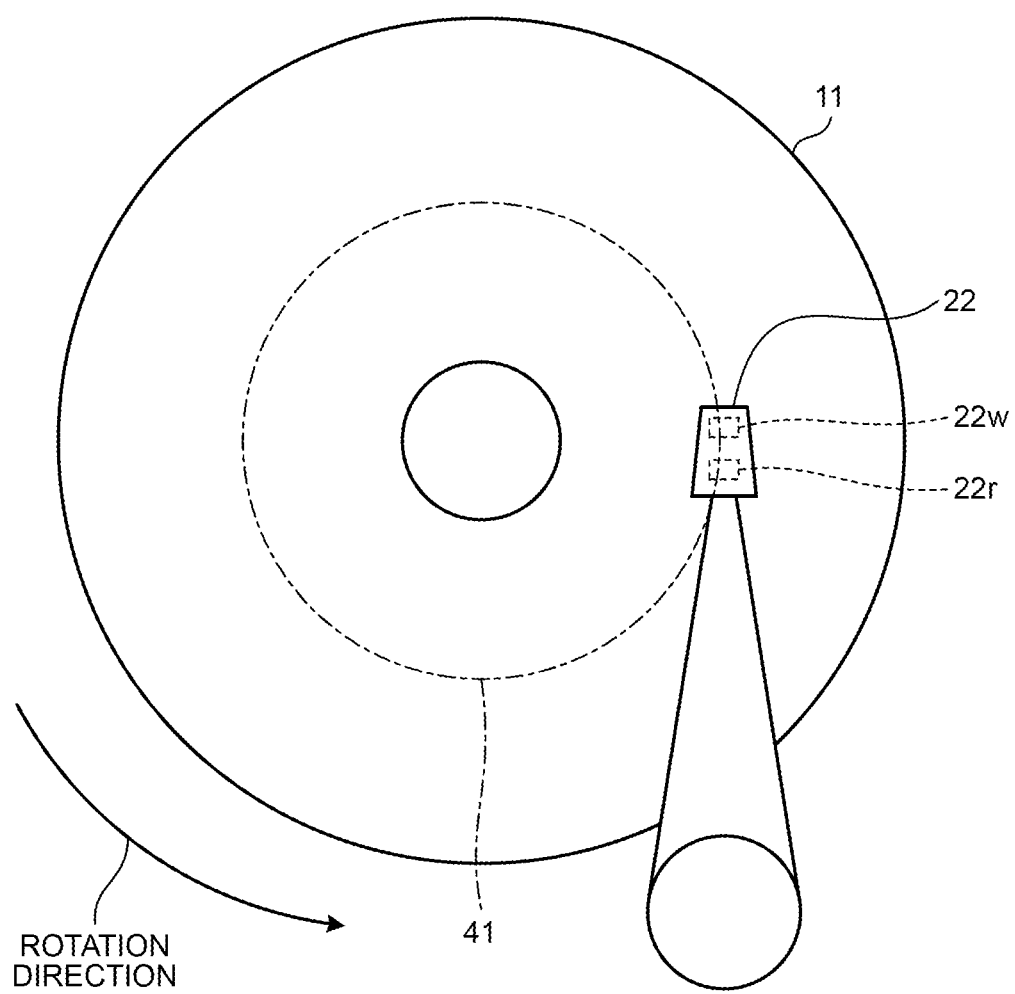
FIG. 3 is a diagram illustrating an exemplary positional relationship between a read head and a write head according to the embodiment.

FIG. 3 is a diagram illustrating an exemplary positional relationship between the read head 22r and the write head 22w according to the embodiment. According to the example illustrated in this drawing, the read head 22r and the write head 22w are arranged in a direction in which the actuator arm 15 extends. The read head 22r is arranged closer to a rotation shaft of the actuator arm 15 than the write head 22w. Then, while the magnetic head 22 is positioned on a certain data track, the write head 22w moves relative to the magnetic disk 11 behind the read head 22r.

In other words, a gap is between the read head 22r and the write head 22w, in the circumferential direction of the magnetic disk 11, and the write head 22w moves relative to the magnetic disk 11 behind the read head 22r as much as the gap. The circumferential length of the gap between the read head 22r and the write head 22w is referred to as read/write gap length.

Note that the read/write gap length changes according to the skew angle of the magnetic head 22. Then, the skew angle of the magnetic head 22 changes according to a radial position of the magnetic head 22. In other words, the read/write gap length changes according to the radial position.

In the write operation, reading the servo data from the servo area SV by the read head 22r and writing data to the data area DA by the write head 22w are performed in a time division manner. However, the write head 22w moves in the circumferential direction of the magnetic disk 11 behind the read head 22r as much as the read/write gap length. Therefore, an area where data cannot be written may occur in the data area DA immediately before the servo sector SV in the circumferential direction. Such an area where data cannot be written is described as an unwritable range in the present specification.

In order to minimize the total capacity of unwritable ranges in the magnetic disk 11, the controller 30 does not read the servo data recorded in a front part of the short servo sector SSV during the write operation.

In the write operation, even if the read head 22r reaches the short servo sector SSV, the controller 30 can write data until the read head 22r reaches a rear part of the short servo sector SSV, thus, suppressing the length of the unwritable range in the data area DA immediately before the short servo sector SSV. Therefore, the total capacity of the unwritable ranges in the magnetic disk 11 can be suppressed.

Note that the servo data recorded in the front part of the short servo sector SSV may be read in a seek operation or the read operation. The read operation is an operation to read data from the data area DA.

Figure 4:
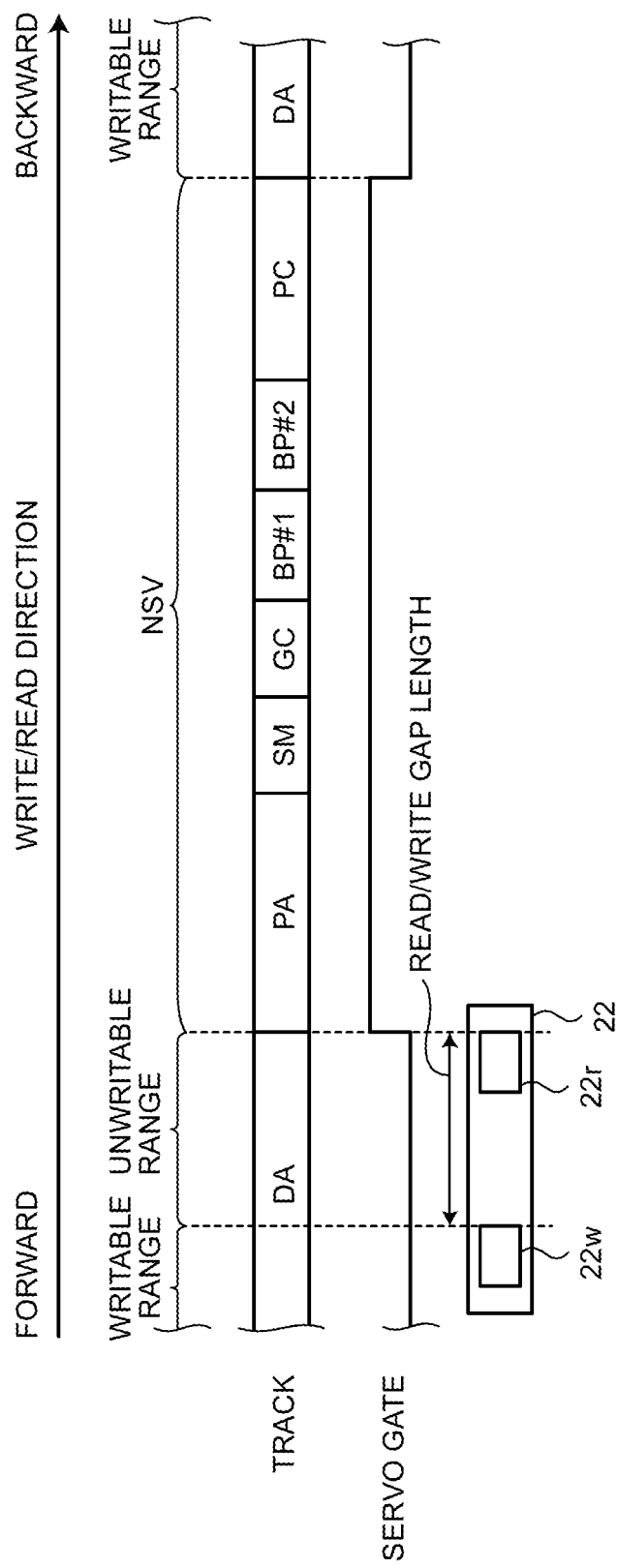
FIG. 4 is a diagram illustrating an exemplary configuration of a normal servo sector according to the embodiment.

FIG. 4 is a diagram illustrating an exemplary configuration of the normal servo sector NSV according to the embodiment.

Hereinafter, when there is a positional relationship in which a first area and a second area are in the write/read direction and the magnetic head passes through the first area prior to the second area, it is defined that the first area is positioned before the second area. Furthermore, it is defined that the second area is positioned after the first area. Furthermore, when there is a plurality of the second areas, a second area of the plurality of the second areas through which the magnetic head passes next to the first area is defined as a second area immediately after the first area. Furthermore, when there is a plurality of the first areas, a first area of the plurality of the first areas through which the magnetic head passes immediately before the second area is defined as a first area immediately before the second area.

In the example illustrated in FIG. 4, in the normal servo sector NSV, a preamble area PA in which a preamble is recorded, a servo mark area SM in which the servo mark is recorded, a gray code area GC in which a gray code is recorded, a burst area BP #1 in which a first burst pattern is recorded, a burst area BP #2 in which a second burst pattern is recorded, and a post code area PC in which a post code is recorded are arranged in this order in the write/read direction.

The preamble is a single period pattern data that periodically changes in the circumferential direction. The preamble is used to adjust the amplitude, phase, and frequency of sampling data when a servo waveform read by the read head 22r is taken, as the sampling data, into the RWC 25 on the basis of a servo clock.

The servo mark is pattern data for adjusting the timing of demodulating the servo data. The controller 30 determines the timing of demodulation of subsequent various servo data on the basis of the timing of detection of the servo mark.

The gray code includes a cylinder address for identifying each track 41 provided on the magnetic disk 11, and the servo sector number that is a number for identifying each servo sector SV on the track 41.

The first burst pattern and the second burst pattern are each pattern data used to detect an amount of positional displacement of a track 41 indicated by a track number included in the gray code, from the track center. Assuming that the cylinder address included in the gray code corresponds to an integer value of the information about the radial position, information indicated after the decimal point of the information about the radial position is obtained by demodulating the first burst pattern and the second burst pattern. The controller 30 performs positioning control of the magnetic head 22, on the basis of a calculated value of the current position of the magnetic head 22 obtained by demodulating the gray code, the first burst pattern, and the second burst pattern.

FIG. 4 further illustrates an exemplary waveform of a servo gate. Note that the waveform of the servo gate illustrated in this drawing represents a waveform during the write operation.

The servo gate is a signal transmitted to the RWC 25 by the processor 26. The servo gate is a signal indicating a period in which demodulation of servo data is permitted. In the example illustrated in FIG. 4, the servo gate at an "H" level indicates that demodulation of the servo data is permitted, and the servo gate at an "L" level indicates that demodulation of the servo data is not permitted. The RWC 25 performs demodulation on a signal read by the read head 22r during a period in which the servo gate is at the "H" level.

Specifically, the RWC 25 determines each of the timing of demodulation of the gray code, the timing of demodulation of the first burst pattern, the timing of demodulation of the second burst pattern, and the timing of demodulation of the post code, on the basis of the timing of detection of the servo mark, and demodulates the respective servo data. These servo data are demodulated during the period in which the servo gate is at the "H" level.

As described above, the write head 22w moves in the circumferential direction of the magnetic disk 11 after the read head 22r as much as the read/write gap length. Then, during a period in which the servo gate is at the "H" level where the read head 22r reads the signal, writing the data via the write head 22w is prohibited. Therefore, as illustrated in FIG. 4, the unwritable range occurs in the data area DA immediately before the normal servo sector NSV.

Hereinafter, transition of the servo gate from the "L" level to the "H" level is referred to as opening the servo gate. Transition of the servo gate from the "H" level to the "L" level is referred to as closing the servo gate.

Figure 5:
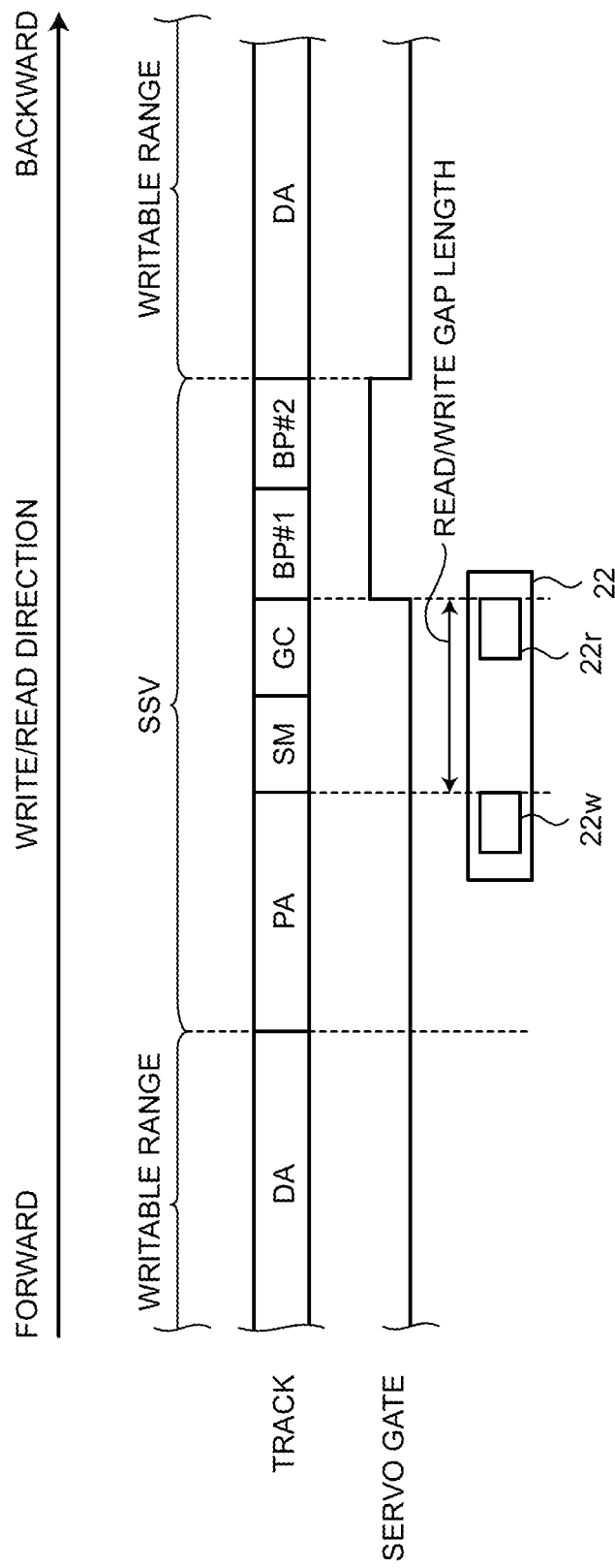
FIG. 5 is a diagram illustrating an exemplary configuration of a short servo sector according to the embodiment.

FIG. 5 is a diagram illustrating an exemplary configuration of the short servo sector SSV according to the embodiment. This drawing illustrates an exemplary waveform of the servo gate. The waveform of the servo gate illustrated in this drawing indicates a waveform during the write operation.

In the short servo sector SSV, the preamble area PA in which a preamble is recorded, the servo mark area SM in which the servo mark is recorded, the gray code area GC in which the gray code is recorded, the burst area BP #1 in which the first burst pattern is recorded, and the burst area BP #2 in which the second burst pattern is recorded are arranged in this order in the write/read direction. In other words, in the example illustrated in FIG. 5, the short servo sector SSV has a configuration in which the post code area PC is omitted from the normal servo sector NSV illustrated in FIG. 4.

Note that the short servo sector SSV may include an area in which auxiliary pattern data is recorded, after the burst area BP #2. The circumferential length of each area of the short servo sector SSV may be the same as or different from the length of a same named area of the normal servo sector NSV.

When the read head 22r passes through the short servo sector SSV in the write operation, for example, the processor 26 opens the servo gate at preset timing when the read head 22r reaches the start of the burst area BP #1, and closes the servo gate at preset timing when the read head 22r reaches the end of the burst area BP #2. Therefore, the waveform of the servo gate prohibits the reading of the servo data during a period in which the magnetic head 22 passes through the front part of the short servo sector SSV, that is, the preamble area PA, the servo mark area SM, and the gray code area GC, in the example illustrated in FIG. 5.

In the example illustrated in FIG. 5, the length from the start of the preamble area PA to the start of the burst area BP #1 is set longer than the read/write gap length. Therefore, the controller 30 is allowed to write data, up to the vicinity of the start of the short servo sector SSV, in the data area DA immediately before the short servo sector SSV. In other words, the occurrence of the unwritable range in the data area DA immediately before the short servo sector SSV is suppressed.

When the servo gate is opened and closed in the pattern illustrated in FIG. 5 during the write operation, the controller 30 does not perform detection of the servo mark in the short servo sector SSV. Therefore, the controller 30 determines the timing of demodulation of the first burst pattern and the timing of demodulation of the second burst pattern in the short servo sector SSV, on the basis of the timing of detection of the servo mark in the servo sector SV (e.g., the normal servo sector NSV) before the short servo sector SSV.

Here, a technology to be compared with the embodiment will be described. A technology to be compared with the embodiment is referred to as a comparative example. According to the comparative example, when a detection of the servo mark is not successfully performed in a certain normal servo sector NSV (referred to as a first normal servo sector NSV) after repeating the detection a predetermined number of times, in the write operation, the controller stores all sections between the first normal servo sector NSV and a normal servo sector NSV immediately after the first normal servo sector NSV (referred to as a second normal servo sector NSV) as a defected area. Then, the controller prohibits writing to the defected area. In other words, in a magnetic disk device having a magnetic disk in which M (where M is an integer of 1 or more) short servo sectors SSV are arranged between two normal servo sectors NSV in the circumferential direction, a section as much as M+1 servo sectors SV becomes the defected area, and an area in which data can be written is significantly reduced. In other words, the capacity of the magnetic disk device decreases.

Meanwhile, according to the embodiment, when the detection of the servo mark is not successfully performed in the first normal servo sector NSV, the controller 30 can read the servo data from the short servo sector SSV immediately before the first normal servo sector NSV and the short servo sector SSV arranged after the first normal servo sector NSV, in a mode similar to that of reading servo data from a normal servo sector NSV. This configuration prevents the occurrence of the defected area caused by non-successful detection of the servo mark in the first normal servo sector NSV, suppressing a decrease in the capacity of the magnetic disk device 1.

Hereinafter, a mode of reading the servo data from the short servo sector SSV, similar to that of reading the servo data from the normal servo sector NSV will be referred to as NSV read mode.

Figure 6:
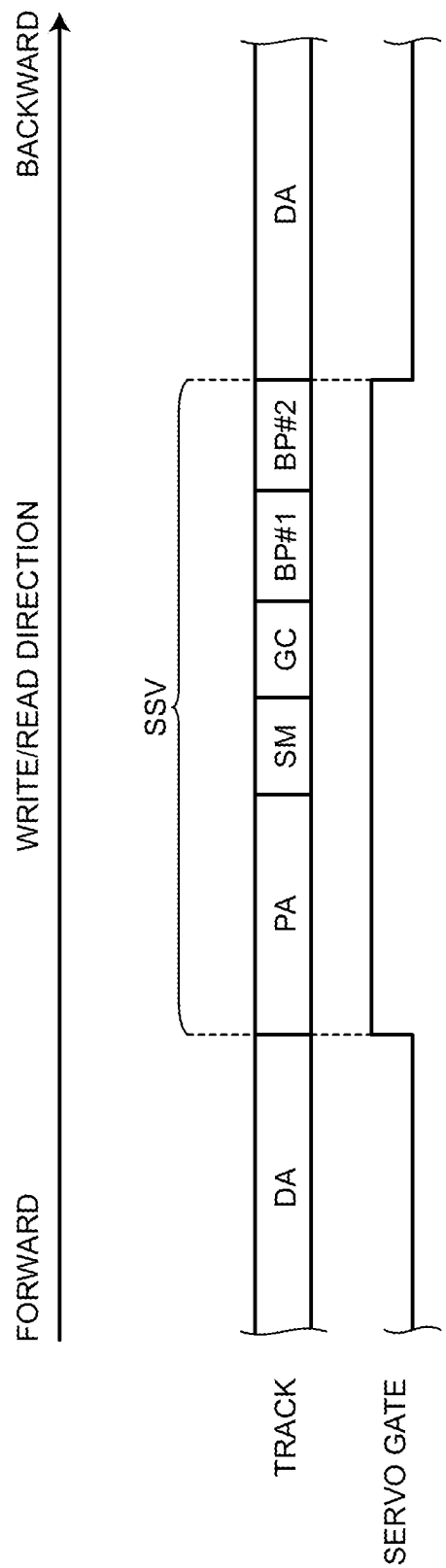
FIG. 6 is a schematic diagram illustrating an NSV read mode according to the embodiment.

FIG. 6 is a schematic diagram illustrating the NSV read mode according to the embodiment.

In the NSV read mode, for example, the processor 26 opens the servo gate at preset timing when the read head 22r reaches the start of the preamble area PA, and closes the servo gate at preset timing when the read head 22r reaches the end of the burst area BP #2.

Therefore, during a period in which the magnetic head 22 passes through the front part of the short servo sector SSV, that is, the preamble area PA, the servo mark area SM, and the gray code area GC, the RWC 25 demodulates the servo data recorded in each of the areas. In other words, in the NSV read mode, the controller 30 also performs detection of the servo marks in the short servo sector SSV.

Note that the demodulation operation for the servo data according to the waveform of the servo gate illustrated in FIGS. 4 and 6 is an example of the first demodulation. The demodulation operation for the servo data according to the waveform of the servo gate illustrated in FIG. 5 is an example of the second demodulation.

In order to maintain the reliability of positioning accuracy, the controller 30 is configured to count the number of times of continuous failure in detection of the servo mark and stop and retry the write operation when a count value exceeds a threshold. For permission of writing to the data area DA immediately after the short servo sector SSV, the threshold is set to M that is the number of short servo sectors SSV arranged between two normal servo sectors NSV adjacent in the circumferential direction. For example, in the example illustrated in FIG. 2, "1" is set as the threshold.

Figure 7:
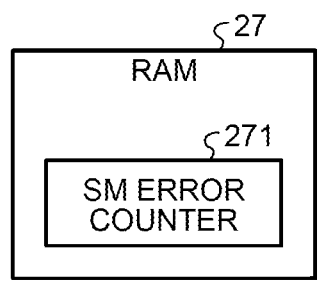
FIG. 7 is a diagram illustrating an exemplary management method for the number of times of continuous failure in detection of the servo mark according to the embodiment.

FIG. 7 is a diagram illustrating an exemplary management method for the number of times of continuous failure in detection of the servo mark according to the embodiment. In the example illustrated in this drawing, an SM error counter 271 is stored in the RAM 27. When a failure in detection of the servo mark occurs, the controller 30 increments the SM error counter 271 by "1." When the detection of the servo mark is successfully performed, the controller 30 resets the SM error counter 271 to "0."

Next, a specific example of control of the write operation by the controller 30 according to the embodiment will be described.

Figure 8:
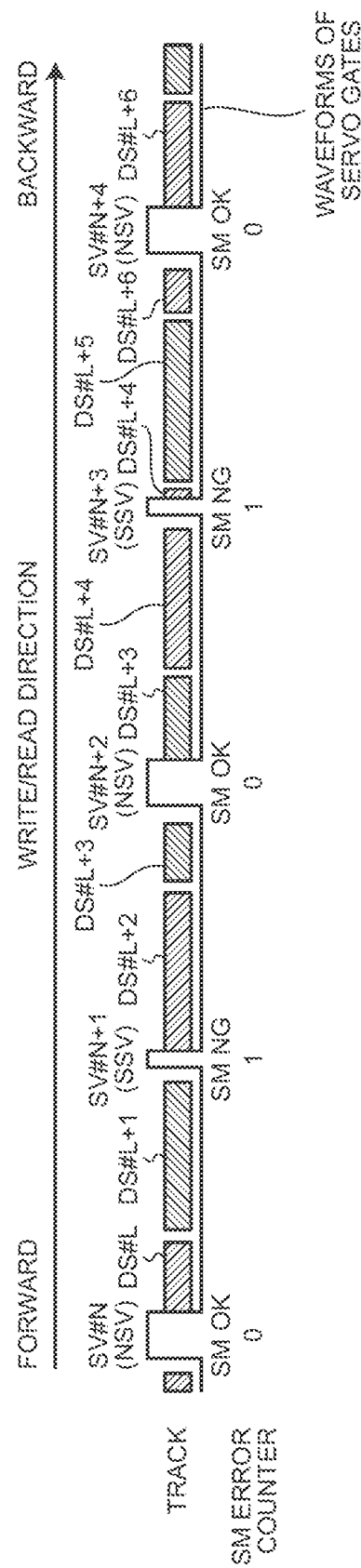
FIG. 8 is a diagram illustrating exemplary control of a write operation by a controller according to the embodiment, the control being performed upon successful detection of the servo mark in any normal servo sector.

FIG. 8 is a diagram illustrating exemplary control of the write operation by the controller 30 according to the embodiment, the control being performed upon successful detection of the servo mark in any normal servo sector NSV.

FIG. 8 illustrates a plurality of data sectors DS in a section from a servo sector SV #N to a servo sector SV #N+4 in a certain track 41. The servo sector SV #N, the servo sector SV #N+2, and the servo sector SV #N+4 are the normal servo sectors NSV. The servo sector SV #N+1 and the servo sector SV #N+1 are the short servo sectors SSV. The plurality of data sectors DS includes data sectors DS #L to DS #L+6. The waveforms of the servo gates are superimposed on the track 41.

Furthermore, a result of the detection of the servo mark and a value of the SM error counter 271 are illustrated for each servo sector SV. "SM OK" indicates that the detection of the servo mark has succeeded, and "SM NG" indicates the failure in detection of the servo mark.

When writing the data sectors DS #L to DS #L+6 in one rotation of the magnetic disk 11, the controller 30 successfully performs the detection of the servo marks in the servo sector SV #N, the servo sector SV #N+2, and the servo sector SV #N+4 which are each the normal servo sector NSV. The detection of the servo mark fails in the servo sector SV #N+1 and the servo sector SV #N+3 which are the short servo sectors SSV.

The SM error counter 271 is set to "0" in response to successful performance of the detection of the servo mark in the servo sector SV #N that is the normal servo sector NSV, and is changed to "1" in response to the failure in the detection of the servo mark in the servo sector SV #N+1 that is the short servo sector SSV. Thereafter, the SM error counter 271 is set to "0" again in response to successful performance of the detection of the servo mark in the servo sector SV #N+2 that is the normal servo sector NSV, and is changed to "1" again in response to the failure in the detection of the servo mark in the servo sector SV #N+3 that is the short servo sector SSV. Then, the SM error counter 271 is set to "0" in response to the successful detection of the servo mark in the servo sector SV #N+4 being the normal servo sector NSV.

In this manner, the SM error counter 271 never exceeds "1" in the illustrated section. Therefore, the writing for each data sector DS is performed in the illustrated section.

FIGS. 9A to 10B are diagrams illustrating an example of the write operation by the controller according to the embodiment, the write operation being performed upon a failure in detection of the servo mark in a certain normal servo sector NSV.

The controller 30 writes data up to the data area DA immediately before the servo sector SV #N+2 being the normal servo sector NSV. Subsequently, upon a failure in detection of the servo mark in the servo sector SV #N+2, the SM error counter 271 becomes "2" in the servo sector SV #N+2, and the SM error counter 271 exceeds the threshold "1," as illustrated in FIG. 9A. Then, the controller 30 stops the write operation for the servo sector SV #N+2 and subsequent servo sectors.

Next, as illustrated in FIG. 9B, the controller 30 sets a read mode of the servo sector SV #N+1 being the short servo sector SSV immediately before the servo sector SV #N+2, to the NSV read mode. Then, the controller 30 retries the write operation for the data area DA from the servo sector SV #N+2 and the subsequent servo sectors.

The servo sector SV #N+1 is set to the NSV read mode, and therefore, the servo mark is demodulated in the servo sector SV #N+1 upon retry of the write operation. When the detection of the servo mark is successfully performed in the servo sector SV #N+1, the SM error counter 271 is set to "0." Then, even if the detection of the servo mark fails again in the servo sector SV #N+2 being the normal servo sector NSV, the SM error counter 271 is set to "1," and the SM error counter 271 is maintained in a state not exceeding the threshold "1." Therefore, the controller 30 writes data to the data area DA immediately after the servo sector SV #N+2.

In other words, in the next rotation of the magnetic disk 11 after the stop of the write operation for the servo sector SV #N+2 and the subsequent servo sectors, the controller 30 performs demodulation for the servo data recorded in the servo sector SV #N+1, in the NSV read mode. Then, the controller 30 having successfully performed the demodulation of the servo mark from the servo data recorded in the servo sector SV #N+1 resumes the write operation from the data area DA immediately after the servo sector SV #N+2 when the magnetic head 22 reaches the servo sector SV #N+2.

Subsequently, the servo sector SV #N+3 being the servo sector SV after the servo sector SV #N+1 by M+1 (i.e., two) is the short servo sector SSV, and therefore, the detection of the servo mark fails. Accordingly, the SM error counter 271 is set to "2." The SM error counter 271 exceeds the threshold "1," and therefore, the controller 30 stops the write operation for the servo sector SV #N+3 and subsequent servo sectors, as illustrated in FIG. 9C.

Subsequently, the controller 30 sets a read mode of the servo sector SV #N+3 to the NSV read mode as illustrated in FIG. 10A. Then, the controller 30 retries the write operation to the data area DA from the servo sector SV #N+3 and the subsequent servo sectors.

The servo sector SV #N+3 is set to the NSV read mode, and therefore, the servo mark is demodulated in the servo sector SV #N+3 upon retry of the write operation. When the detection of the servo mark is successfully performed in the servo sector SV #N+3, the SM error counter 271 is set to "0," and the SM error counter 271 is maintained in a state not exceeding the threshold "1." Therefore, as illustrated in FIG. 10B, the controller 30 writes data to the data area DA immediately after the servo sector SV #N+3.

In other words, in the next rotation of the magnetic disk 11 after the stop of the write operation for the servo sector SV #N+3 and the subsequent servo sectors, the controller 30 performs demodulation for the servo data recorded in the servo sector SV #N+3, in the NSV read mode. Then, the controller 30 having successfully performed the demodulation of the servo mark from the servo data recorded in the servo sector SV #N+3 resumes the write operation from the data area DA immediately after the servo sector SV #N+3.

Upon successful performance of the detection of the servo mark in the servo sector SV #N+4 being the normal servo sector NSV, the SM error counter 271 is set to "0." The SM error counter 271 does not exceed the threshold "1," and therefore, the controller 30 writes data to the data area DA immediately after the servo sector SV #N+4.

As described above, according to the embodiment, upon the failure in detection of the servo mark in the first normal servo sector NSV (e.g., the servo sector SV #N+2 in FIG. 9A), the read mode of a first short servo sector SSV (e.g., the servo sector SV #N+1 in FIG. 9B) that is the short servo sector SSV immediately before the first normal servo sector NSV is set to the NSV read mode, for retry of the write operation. This configuration makes it possible to prevent the data area DA immediately after the first normal servo sector NSV from being the defected area, and thus, unlike the comparative example, the decrease in the capacity of the magnetic disk device 1 is suppressed.

In addition, according to the embodiment, the controller 30 stops the read operation due to the SM error counter 271 exceeding the threshold "1" in a second short servo sector SSV (e.g., the servo sector SV #N+3 in FIG. 9C) that is the short servo sector SSV after the first normal servo sector NSV. Then, the controller 30 sets the read mode of the second short servo sector SSV to the NSV read mode to perform retry of the write operation. This configuration makes it possible to prevent the data area DA immediately after the second normal servo sector NSV from being the defected area, and thus, the decrease in the capacity of the magnetic disk device 1 is suppressed.

Note that according to the embodiment, at the time when the read mode of a certain short servo sector SSV is set to the NSV read mode, writing of data to the data area DA immediately before the short servo sector SSV is completed. Therefore, no unwritable area occurs due to setting the read mode of the short servo sector SSV to the NSV read mode.

In other words, according to the embodiment, it is possible to prevent the decrease in the capacity of the magnetic disk device 1 due to the failure in the detection of the servo mark in the normal servo sector NSV.

Next, a method of controlling the magnetic disk device 1 by the controller 30 according to the embodiment will be described.

Figure 11:
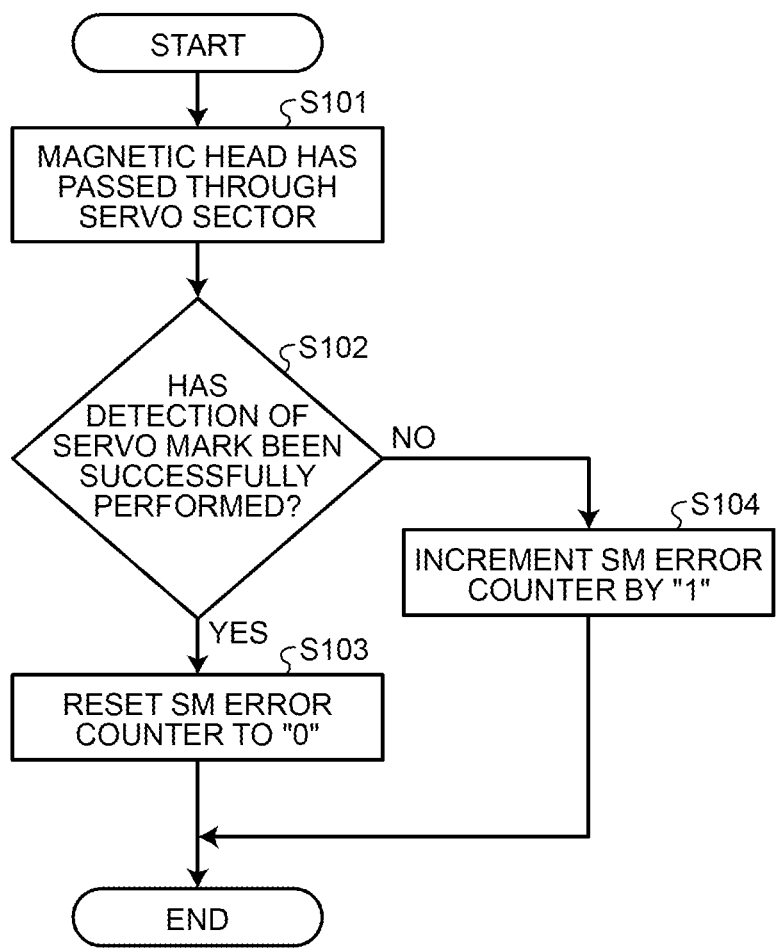
FIG. 11 is a flowchart illustrating an exemplary control operation for an SM error counter by the controller according to the embodiment.

FIG. 11 is a flowchart illustrating an exemplary control operation for the SM error counter 271 by the controller 30 according to the embodiment. A series of operation steps illustrated in this drawing is performed every time the magnetic head 22 passes through each servo sector SV.

When the magnetic head 22 has passed through a certain servo sector SV (S101), the controller 30 determines whether the detection of the servo mark recorded in the turbo sector SV has been successfully performed (S102). When the servo sector SV through which the magnetic head 22 having passed is the short servo sector SSV and the servo gate is opened and closed according to the pattern illustrated in FIG. 5, the servo mark is not demodulated, and thus, the controller 30 determines that the detection of the servo mark has not been successfully performed. Even when the demodulation of the servo mark is performed in the servo sector SV through which the magnetic head 22 having passed, the controller 30 determines that the detection of the servo mark has not been successfully performed, when the demodulation fails due to a defect or the like included in the servo mark. When the demodulation of the servo mark has been successfully performed in the servo sector SV through which the magnetic head 22 having passed, the controller 30 determines that the detection of the servo mark has successfully performed.

When the detection of the servo mark is successfully performed (S102: Yes), the controller 30 resets the SM error counter 271 to "0" (S103). When the detection of the servo marks is not successfully performed (S102: No), the controller 30 increments the SM error counter 271 by "1" (S104). After the processing of Step S103 or the processing of Step S104, the control operation for the SM error counter 271 is finished.

Figure 12:
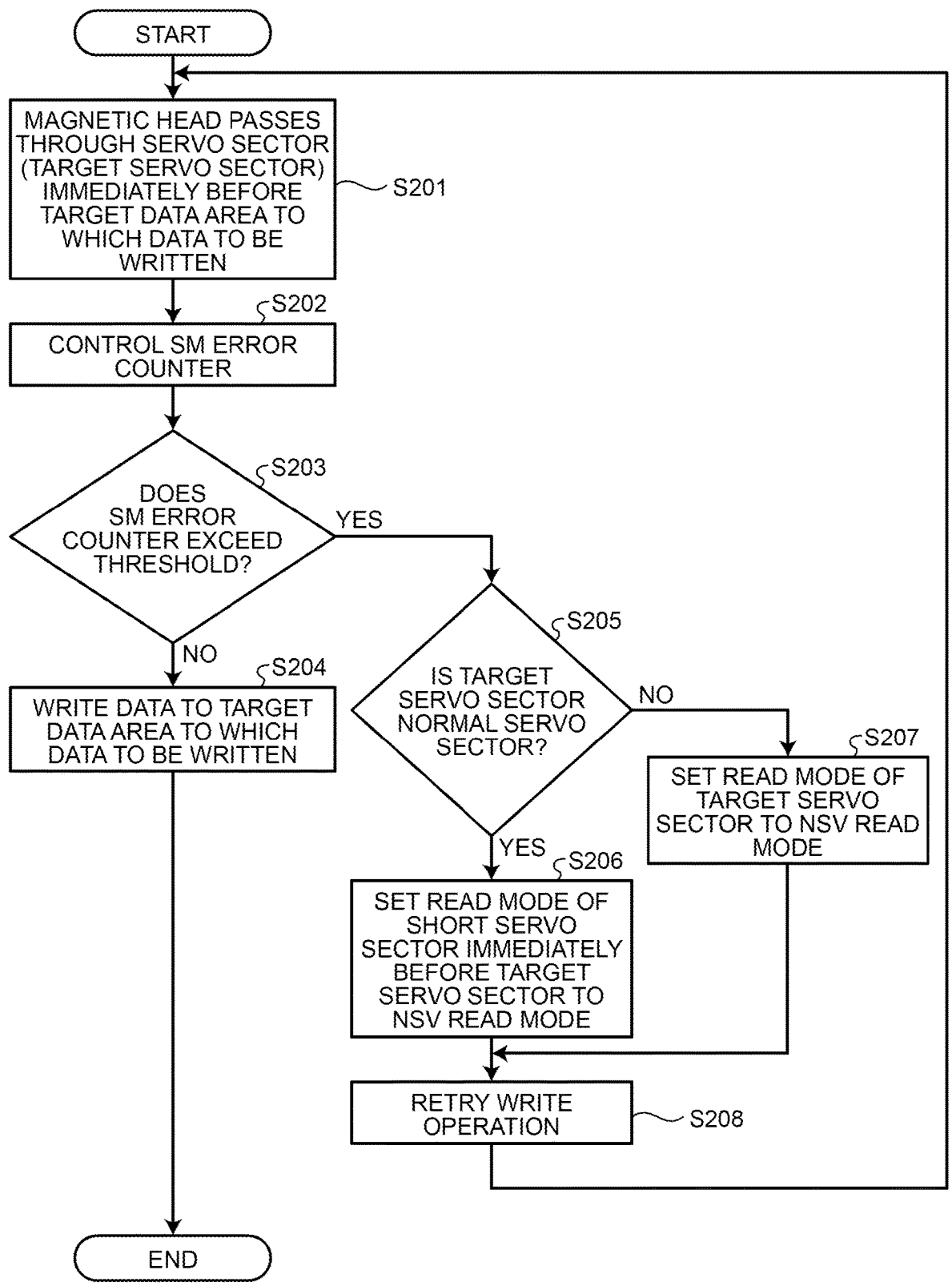
FIG. 12 is a flowchart illustrating exemplary control of the write operation by the controller according to the embodiment.

FIG. 12 is a flowchart illustrating exemplary control of the write operation by the controller 30 according to the embodiment. This drawing illustrates an operation performed when the magnetic head 22 passes through the servo sector SV immediately before a certain target data area DA to which data to be written.

When the magnetic head 22 passes through the servo sector immediately before the target data area DA to which data to be written (S201), the controller 30 performs the control of the SM error counter 271 (S202). In Step S202, the controller 30 performs, for example, a series of operation steps illustrated in FIG. 11.

Note that in the description of FIG. 12, the servo sector immediately before the target data area DA to which data to be written is referred to as target servo sector SV.

Then, the controller 30 determines whether the SM error counter 271 exceeds the threshold (S203). For example, M is set in advance as the threshold.

When the SM error counter 271 does not exceed the threshold (S203: No), the controller 30 writes data to the target data area DA to which data to be written (S204), and a series of operation steps is finished.

When the SM error counter 271 exceeds the threshold (S203: Yes), the controller 30 determines whether the target servo sector SV is the normal servo sector NSV (S205).

When the target servo sector SV is the normal servo sector NSV (S205: Yes), the read mode of the short servo sector SSV immediately before the target servo sector SV is set to the NSV read mode (S206).

When the target servo sector SV is not the normal servo sector NSV (S205: No), that is, when the target servo sector SV is the short servo sector SSV, the read mode of the target servo sector SV is set to the NSV read mode (S207).

After the process of Step S206 or the process of step S207, the controller 30 retries the write operation (S208). In other words, after one rotation of the magnetic disk 11, the operation from Step S201 is performed again.

The controller 30 performs the control illustrated in FIGS. 11 and 12, thereby implementing the operations illustrated in FIGS. 8 to 10B.

Note that in the above description, upon the failure in detection of the servo mark in the first normal servo sector NSV, the controller 30 sets the read mode of the short servo sector SSV immediately before the first normal servo sector NSV to the NSV read mode, in the first retry of the write operation, and then sets the read mode of the second short servo sector SSV after the first normal servo sector NSV to the NSV read mode, in the second retry of the write operation. The operation of the controller 30 performed upon the failure in detection of the servo mark in the first normal servo sector NSV is not limited to this description.

For example, upon the failure in detection of the servo mark in the first normal servo sector NSV, the controller 30 may set both the read mode of the first short servo sector SSV and the read mode of the second short servo sector SSV to the NSV read mode to perform the first retry of the read operation. Due to such a configuration of the controller 30, the unwritable range occurs immediately before the second short servo sector SSV, but a total number of times of retry of the write operation can be suppressed.

As described above, according to the embodiment, the plurality of first servo sectors (e.g., the plurality of servo sectors SV) is spaced circumferentially on the magnetic disk 11. The plurality of first servo sectors includes the plurality of second servo sectors (e.g., a plurality of normal servo sectors NSV) and the plurality of third servo sectors (e.g., a plurality of short servo sectors SSV). M (where M is an integer of 1 or more) third servo sectors of the plurality of third servo sectors are arranged, between two adjacent second servo sectors of the plurality of second servo sectors.

While the controller 30 performs the first demodulation for the servo data recorded in each of the plurality of second servo sectors, and performs second demodulation for the servo data recorded in each of the plurality of third servo sectors, the controller 30 writes data to the plurality of data areas DA by using the magnetic head 22. The first demodulation is an operation of detecting the servo mark and demodulating the burst pattern. The second demodulation is an operation of demodulating the burst pattern without detecting the servo mark. Upon a failure in detection of the servo mark in the first demodulation for the servo data recorded in the fourth servo sector (e.g., the servo sector SV #N+2 in FIGS. 9A to 9C) being one of the plurality of second servo sectors, the controller 30 stops writing data. The controller 30 performs the first demodulation for the servo data recorded in the fifth servo sector (e.g., the servo sector SV #N+1 in FIGS. 9A to 9C) being a third servo sector immediately before the fourth servo sector in the write/read direction, of the plurality of the third servo sectors. Then, when the magnetic head 22 reaches the fourth servo sector after the first demodulation is performed for the servo data recorded in the fifth servo sector, the controller 30 starts writing data from a data area DA immediately after the fourth servo sector, of the plurality of data areas DA.

Therefore, it is possible to prevent the data area DA immediately after the fourth servo sector from being the defected area, and thus, unlike the comparative example, the decrease in the capacity of the magnetic disk device 1 is suppressed.

In addition, according to the embodiment, upon the failure in detection of the servo mark in the first demodulation for the servo data recorded in the fourth servo sector, the controller 30 performs the first demodulation for the servo data recorded in a sixth servo sector (e.g., the servo sector SV #N+3 in FIGS. 10A and 10B) being a third servo sector immediately after the fourth servo sector in the write/read direction, of the plurality of the third servo sectors.

Therefore, it is possible to prevent the data area DA immediately after the sixth servo sector from being the defected area, and thus, the decrease in the capacity of the magnetic disk device 1 is further suppressed.

Note that, as described above, the first demodulation for the fifth servo sector and the first demodulation for the sixth servo sector may be performed in the first retry of the write operation. Alternatively, the first demodulation for the fifth servo sector may be performed in the first retry of the write operation, and the first demodulation for the sixth servo sector may be performed in the second retry of the write operation.

In addition, according to the embodiment, the controller 30 stops writing data again, when the magnetic head 22 passes through a seventh servo sector (e.g., the servo sector SV #N+3 in FIGS. 10A and 10B) being the first servo sector after the fifth servo sector by M+1 in the write/read direction, of the plurality of the first servo sectors, after starting writing data from the data area DA immediately after the fourth servo sector. Then, the controller 30 performs the first demodulation for the servo data recorded in the seventh servo sector, and starts writing data again from the data area DA immediately after the seventh servo sector, of the plurality of data areas DA.

Therefore, it is possible to suppress the occurrence of the unwritable range in the data area DA immediately before the seventh servo sector, and therefore, the decrease in the capacity of the magnetic disk device 1 can be further suppressed.

Furthermore, according to the embodiment, the controller 30 counts the number of times of continuous failure in detection of the servo mark, and stops writing data when the count value exceeds M. When an eighth servo sector being the first servo sector through which the magnetic head has passed upon the count value being M+1 is one of the plurality of second servo sectors (e.g., determined as Yes in Step S205 in FIG. 12), the first demodulation is performed for the servo data recorded in a ninth servo sector being the third servo sector immediately before the eighth servo sector in the write/read direction, of the plurality of third servo sectors, and when the magnetic head reaches the eighth servo sector after the first demodulation for the servo data recorded in the ninth servo sector, writing data is started from a data area immediately after the eighth servo sector, of the plurality of data areas. When the eighth servo sector is one of the plurality of third servo sectors (e.g., determined as No in Step S205 in FIG. 12), the first demodulation is performed for the servo data recorded in the eighth servo sector, and writing data is started from the data area immediately after the eighth servo sector, of the plurality of data areas.

Therefore, the operations illustrated in FIGS. 8 to 10B are implemented, and therefore, the decrease in the capacity of the magnetic disk device 1 is suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk that includes a spaced circumferential arrangement of a plurality of first servo sectors recording servo data including a servo mark and a burst pattern recorded after the servo mark in a circumferential write/read direction, and includes a plurality of data areas each provided between two first servo sectors adjacent in a circumferential direction, the plurality of first servo sectors including a plurality of second servo sectors and a plurality of third servo sectors, M (where M is an integer of 1 or more) third servo sectors of the plurality of third servo sectors being arranged between two adjacent second servo sectors of the plurality of second servo sectors;
   a magnetic head; and
   a controller that
      while performing first demodulation for the servo data recorded in each of the plurality of second servo sectors and second demodulation for the servo data recorded in each of the plurality of third servo sectors, writes data for the plurality of data areas by using the magnetic head, the first demodulation being an operation of detecting the servo mark and demodulating the burst pattern, the second demodulation being an operation of demodulating the burst pattern without detecting the servo mark, and
      upon a failure in detection of the servo mark in the first demodulation for the servo data recorded in a fourth servo sector being one of the plurality of second servo sectors, stops writing the data,
performs the first demodulation for the servo data recorded in a fifth servo sector being a third servo sector immediately before the fourth servo sector in the write/read direction, of the plurality of third servo sectors, and
starts writing the data from a data area immediately after the fourth servo sector of the plurality of data areas, when the magnetic head reaches the fourth servo sector after the first demodulation for the servo data recorded in the fifth servo sector.

2. The magnetic disk device according to claim 1, wherein upon the failure in detection of the servo mark in the first demodulation for the servo data recorded in the fourth servo sector, the controller performs the first demodulation for the servo data recorded in a sixth servo sector being a third servo sector after the fourth servo sector in the write/read direction, of the plurality of third servo sectors.

3. The magnetic disk device according to claim 1, wherein the controller
stops writing the data again, when the magnetic head passes through a seventh servo sector being a first servo sector after the fifth servo sector by M+1 in the write/read direction, of the plurality of first servo sectors, after starting writing the data from the data area immediately after the fourth servo sector, and
performs the first demodulation for the servo data recorded in the seventh servo sector, and starts writing the data again from a data area immediately after the seventh servo sector, of the plurality of data areas.

4. The magnetic disk device according to claim 1, wherein the controller
counts the number of times of continuous failure in detection of the servo mark and stops writing the data when a count value exceeds M,
in a case where an eighth servo sector being a first servo sector through which the magnetic head has passed upon the count value being M+1 is one of the plurality of second servo sectors, performs the first demodulation for the servo data recorded in a ninth servo sector being a third servo sector immediately before the eighth servo sector in the write/read direction, of the plurality of third servo sectors, and when the magnetic head reaches the eighth servo sector after the first demodulation for the servo data recorded in the ninth servo sector, starts writing the data from a data area immediately after the eighth servo sector, of the plurality of data areas, and
in a case where the eighth servo sector is one of the plurality of third servo sectors, performs the first demodulation for the servo data recorded in the eighth servo sector, and starts writing data from a data area immediately after the eighth servo sector, of the plurality of data areas.

5. A magnetic disk device comprising:
a magnetic disk that includes a spaced circumferential arrangement of a plurality of first servo sectors recording servo data including a servo mark and a burst pattern recorded after the servo mark in a circumferential write/read direction, and includes a plurality of data areas each provided between two first servo sectors adjacent in a circumferential direction, the plurality of first servo sectors including a plurality of second servo sectors and a plurality of third servo sectors, M (where M is an integer of 1 or more) third servo sectors of the plurality of third servo sectors being arranged between two adjacent second servo sectors of the plurality of second servo sectors;
a magnetic head; and
a controller that
while performing first demodulation for the servo data recorded in each of the plurality of second servo sectors and second demodulation for the servo data recorded in each of the plurality of third servo sectors, writes data for the plurality of data areas by using the magnetic head, the first demodulation being an operation of detecting the servo mark and demodulating the burst pattern, the second demodulation being an operation of demodulating the burst pattern without detecting the servo mark, and
performs the first demodulation for the servo data recorded on one of the plurality of third servo sectors, upon retry of writing data to the plurality of data areas.

6. A method of writing data to a magnetic disk that includes a spaced circumferential arrangement of a plurality of first servo sectors recording servo data including a servo mark and a burst pattern recorded after the servo mark in a circumferential write/read direction, and includes a plurality of data areas each provided between two first servo sectors adjacent in a circumferential direction, the plurality of first servo sectors including a plurality of second servo sectors and a plurality of third servo sectors, M (where M is an integer of 1 or more) third servo sectors of the plurality of third servo sectors being arranged between two adjacent second servo sectors of the plurality of second servo sectors, the method comprising:
writing data for the plurality of data areas by using the magnetic head while performing first demodulation for the servo data recorded in each of the plurality of second servo sectors and second demodulation for the servo data recorded in each of the plurality of third servo sectors, the first demodulation being an operation of detecting the servo mark and demodulating the burst pattern, the second demodulation being an operation of demodulating the burst pattern without detecting the servo mark; and
upon a failure in detection of the servo mark in the first demodulation for the servo data recorded in a fourth servo sector being one of the plurality of second servo sectors,
stopping writing the data,
performing the first demodulation for the servo data recorded in a fifth servo sector being a third servo sector immediately before the fourth servo sector in the write/read direction, of the plurality of third servo sectors, and
starting writing the data from a data area immediately after the fourth servo sector of the plurality of data areas, when the magnetic head reaches the fourth servo sector after the first demodulation for the servo data recorded in the fifth servo sector.

7. The method according to claim 6, further comprising upon the failure in detection of the servo mark in the first demodulation for the servo data recorded in the fourth servo sector, performing the first demodulation for the servo data recorded in a sixth servo sector being a third servo sector after the fourth servo sector in the write/read direction, of the plurality of third servo sectors.

8. The method according to claim 6, further comprising:
stopping writing the data again, when the magnetic head passes through a seventh servo sector being a first servo sector after the fifth servo sector by M+1 in the write/ read direction, of the plurality of first servo sectors, after starting writing the data from the data area immediately after the fourth servo sector; and performing the first demodulation for the servo data recorded in the seventh servo sector, and starting writing the data again from a data area immediately after the seventh servo sector, of the plurality of data areas.

9. The method according to claim 6, further comprising:

counting the number of times of continuous failure in detection of the servo mark and stops writing the data when a count value exceeds M;

in a case where an eighth servo sector being a first servo sector through which the magnetic head has passed upon the count value being M+1 is one of the plurality of second servo sectors, performing the first demodulation for the servo data recorded in a ninth servo sector being a third servo sector immediately before the eighth servo sector in the write/read direction, of the plurality of third servo sectors, and when the magnetic head reaches the eighth servo sector after the first demodulation for the servo data recorded in the ninth servo sector, starting writing the data from a data area immediately after the eighth servo sector, of the plurality of data areas; and in a case where the eighth servo sector is one of the plurality of third servo sectors, performing the first demodulation for the servo data recorded in the eighth servo sector, and starting writing the data from a data area immediately after the eighth servo sector, of the plurality of data areas.

* * * * *